(12) United States Patent
Jakkula et al.

(10) Patent No.: US 10,723,955 B2
(45) Date of Patent: *Jul. 28, 2020

(54) FUEL COMPOSITION FOR A DIESEL ENGINE

(71) Applicant: Neste Oyj, Espoo (FI)

(72) Inventors: Juha Jakkula, Kerava (FI); Pekka Aalto, Porvoo (FI); Vesa Niemi, Porvoo (FI); Ulla Kiiski, Hamari (FI); Jouko Nikkonen, Hamari (FI); Seppo Mikkonen, Porvoo (FI); Outi Piirainen, Helsinki (FI)

(73) Assignee: Neste OYJ, Espoo (FI)

( * ) Notice: Subject to any disclaimer, the term of this patent is extended or adjusted under 35 U.S.C. 154(b) by 177 days.

This patent is subject to a terminal disclaimer.

(21) Appl. No.: 14/033,134

(22) Filed: Sep. 20, 2013

(65) Prior Publication Data

US 2014/0024865 A1 Jan. 23, 2014

Related U.S. Application Data

(60) Continuation of application No. 13/480,562, filed on May 25, 2012, now abandoned, which is a continuation of application No. 12/354,634, filed on Jan. 15, 2009, now Pat. No. 8,187,344, which is a division of application No. 11/852,096, filed on Sep. 7, 2007, now abandoned, which is a continuation of application No. 10/655,798, filed on Sep. 5, 2003, now Pat. No. 7,279,018.

(60) Provisional application No. 60/408,302, filed on Sep. 6, 2002.

(51) Int. Cl.
*C10L 1/08* (2006.01)
*C10G 3/00* (2006.01)
*C10L 1/32* (2006.01)

(52) U.S. Cl.
CPC ............... *C10G 3/50* (2013.01); *C10L 1/08* (2013.01); *C10L 1/32* (2013.01); *Y02P 30/20* (2015.11)

(58) Field of Classification Search
CPC ... C10L 1/08; C10L 10/02; C10L 1/32; C10G 3/00; C10G 2400/04; C10G 3/50; Y02E 50/00
USPC .............................. 44/300; 585/14, 240, 242
See application file for complete search history.

(56) References Cited

U.S. PATENT DOCUMENTS

| | | |
|---|---|---|
| 3,898,153 A | 8/1975 | Leuder et al. |
| 3,929,615 A | 12/1975 | Linden et al. |
| 4,233,140 A | 11/1980 | Antonelli et al. |
| 4,300,009 A | 11/1981 | Haag et al. |
| 4,518,485 A | 5/1985 | LaPierre et al. |
| 4,724,260 A | 2/1988 | Kirchhoff et al. |
| 4,746,420 A | 5/1988 | Darian et al. |
| 4,814,543 A | 3/1989 | Chen et al. |
| 4,859,311 A | 8/1989 | Miller |
| 4,859,312 A | 8/1989 | Miller |
| 4,960,960 A | 10/1990 | Harrison et al. |
| 4,992,605 A | 2/1991 | Craig et al. |
| 5,092,908 A | 3/1992 | Feldman et al. |
| 5,093,535 A | 3/1992 | Harrison et al. |
| 5,105,015 A | 4/1992 | Lin et al. |
| 5,135,638 A | 4/1992 | Miller |
| 5,158,982 A | 10/1992 | Stapp |
| 5,169,813 A | 12/1992 | Miller et al. |
| 5,183,556 A | 2/1993 | Reilly et al. |
| 5,246,566 A | 9/1993 | Miller |
| 5,326,762 A | 7/1994 | Clader et al. |
| 5,346,724 A | 9/1994 | Ohgake et al. |
| 5,378,348 A | 1/1995 | Davis et al. |
| 5,502,077 A | 3/1996 | Breivik et al. |
| 5,578,090 A | 11/1996 | Bradin |
| 5,578,091 A | 11/1996 | Jackson et al. |
| 5,688,749 A | 11/1997 | Ibuki et al. |
| 5,705,722 A | 1/1998 | Monnier et al. |
| 5,814,109 A | 9/1998 | Cook |
| 5,861,441 A | 1/1999 | Waycuilis |
| 5,866,376 A | 3/1999 | Wittenbrink et al. |
| 5,882,505 A | 3/1999 | Wittenbrink et al. |
| 5,906,729 A | 5/1999 | Chou |
| 6,048,587 A | 4/2000 | Estrin |
| 6,123,835 A | 9/2000 | Ackerson et al. |
| 6,150,575 A * | 11/2000 | Angevine et al. .............. 585/14 |
| 6,174,501 B1 | 1/2001 | Noureddini |

(Continued)

FOREIGN PATENT DOCUMENTS

| | | |
|---|---|---|
| CA | 1313200 | 1/1993 |
| CA | 2149685 | 9/1999 |

(Continued)

OTHER PUBLICATIONS

Abhari et al., "New Routes to Ethylene," EEPC Seminar in Berlin, Germany (2010).

(Continued)

*Primary Examiner* — Cephia D Toomer
(74) *Attorney, Agent, or Firm* — Finnegan, Henderson, Farabow, Garrett & Dunner, LLP

(57) ABSTRACT

The invention is directed to a fuel composition for diesel engines. The fuel composition comprises 0.1-99% by weight of a component or a mixture of components produced from biological raw material originating from plants and/or animals and/or fish. The fuel composition comprises 0-20% of components containing oxygen. Both components are mixed with diesel components based on crude oil and/or fractions from Fischer-Tropsch process.

28 Claims, No Drawings

(56) References Cited

U.S. PATENT DOCUMENTS

| | | | |
|---|---|---|---|
| 6,399,845 | B1 | 6/2002 | Raulo et al. |
| 6,440,057 | B1 | 8/2002 | Ergun et al. |
| 6,461,497 | B1* | 10/2002 | Pedersen .................... 208/15 |
| 6,787,022 | B1 | 9/2004 | Berlowitz et al. |
| 6,833,064 | B2 | 11/2004 | Berlowitz et al. |
| 6,982,155 | B1 | 1/2006 | Fukuda et al. |
| 7,045,100 | B2 | 5/2006 | Ergun et al. |
| 7,201,837 | B2* | 4/2007 | Stewart et al. ............. 208/14 |
| 7,754,931 | B2 | 7/2010 | Monnier et al. |
| 7,846,323 | B2 | 12/2010 | Abhari et al. |
| 7,968,757 | B2 | 6/2011 | Abhari et al. |
| 8,026,401 | B2 | 9/2011 | Abhari et al. |
| 8,212,094 | B2 | 7/2012 | Mylloja et al. |
| 8,278,492 | B2 | 10/2012 | Myllyoja et al. |
| 2001/0027937 | A1 | 10/2001 | Tsao et al. |
| 2002/0027937 | A1 | 3/2002 | Govorkov et al. |
| 2002/0062053 | A1 | 5/2002 | Berlowitz et al. |
| 2007/0068848 | A1 | 3/2007 | Monnier et al. |

FOREIGN PATENT DOCUMENTS

| | | |
|---|---|---|
| CA | 2316141 | 2/2001 |
| CA | 2400944 | 8/2001 |
| CN | 1279663 | 1/2001 |
| CZ | 283575 | 2/1998 |
| DE | 4116905 | 8/1992 |
| DE | 20113126 | 11/2001 |
| EP | 0 154 150 | 9/1985 |
| EP | 0 412 785 A1 | 2/1991 |
| EP | 0 615 857 B1 | 11/1998 |
| EP | 1396531 | 3/2004 |
| FI | 72435 | 2/1987 |
| FI | 73367 | 6/1987 |
| FI | 89073 | 4/1993 |
| FI | 933982 | 9/1993 |
| FI | 95391 | 1/1996 |
| FI | 100248 | 10/1997 |
| FR | 2607803 | 6/1988 |
| GB | 1002922 | 9/1965 |
| GB | 1524781 | 9/1978 |
| GB | 2090611 | 7/1982 |
| IE | 921671 | 12/1995 |
| JP | 151914 | 8/1942 |
| JP | 2002/501570 | 1/2002 |
| SE | 520633 | 8/1997 |
| SE | 9700149 | 8/1997 |
| WO | WO 1992/003396 | 3/1992 |
| WO | WO 1992/16601 | 10/1992 |
| WO | WO 1995/25152 | 9/1995 |
| WO | WO 1998/056876 | 12/1998 |
| WO | WO 1999/26913 | 6/1999 |
| WO | WO 00/29512 | 5/2000 |
| WO | WO 2000/043335 | 7/2000 |
| WO | WO 2001/012581 | 2/2001 |
| WO | WO 2001/038553 | 5/2001 |
| WO | WO 2001/49812 | 7/2001 |
| WO | WO 2003/016442 | 2/2003 |
| WO | WO 03/022960 | 3/2003 |
| WO | WO 2003/022960 | 3/2003 |
| WO | WO 2007/033460 | 3/2007 |

OTHER PUBLICATIONS

The Advisory Action dated Dec. 20, 2005 issued in U.S. Pat. No. 7,279,018.
Advisory Action for U.S. Appl. No. 10/655,798, dated Dec. 20, 2005. 3 pp. (Exhibit 5).
Advisory Action, Reexam Control No. 90/010,548, dated Apr. 8, 2011.
Advisory Action, Reexam Control No. 90/010,548, dated Apr. 28, 2011.
Advisory Action, Reexam Control No. 90/010,549, dated Jun. 21, 2011.
Ali et al., "Fuel Properties of Tallow and Soybean Oil Ester," JAOCS, vol. 72, No. 12 (1995).
Amendment in Response to Non-Final Office Action (attachments omitted) for U.S. Appl. No. 10/655,798, filed Sep. 18, 2006, 7 pp. (Exhibit 5).
The Amendment dated Dec. 22, 2006 issued in U.S. Pat. No. 7,232,935.
Amendment, Reexam Control No. 90/010,548, dated Mar. 23, 2010.
Amendment After Final, Reexam Control No. 90/010,548, dated Mar. 7, 2011.
Amendment filed in Nov. 14, 2012, in Reexamination Control No. 95/002,084.
Amendment under 37 CFR § 1.111 (accompanying Request for Continued Examination—attachments omitted) for U.S. Appl. No. 10/655,798, filed Mar. 3, 2006, 8 pp. (Exhibit 5).
Appeal Brief and Exhibits, Reexam Control No. 90/010,549, dated Jul. 6, 2011.
Applicant Initiated Interview Request Form for U.S. Appl. No. 12/354,634, filed Oct. 19, 2011, 4 pp. (Exhibit 3).
ASTM D975 (2012).
Batts et al., "A Literature Review on Fuel Stability Studies with Particular Emphasis on Diesel Oil," Energy & Fuels 1991, 5, 2-21.
Bauldauf et al., "Processing of Vegetable Oil to Fiels in Mineral Oil Refinery Processes", VDE Reports, No. 1126 (1994) pp. 153-168.
Better Rendering, A Manual Prepared by Proctor & Gamble, $2^{nd}$ Ed. (1967), pp. ix-xi, 1-21.
Board Decision, Reexam Control No. 90/010,549, dated Mar. 22, 2012.
Burch et al., "Melting Point Model of Alkanes," J. Chem. Eng. Data; 2004, vol. 49, pp. 858-863.
Canakci et al, "Biodiesel Production from Oils and Fats with high Free Fatty Acids," Transactions of the ASAE, vol. 44(6): 1429-1436 (2001).
CANMET'95: New Directions, p. 14 (1995).
Cecchi et al., "Conversion of Vegetable Oils Into Potential Fuels, Preliminary Trial.", Revue Fransaise Des Corps Gras. vol. 34, No. 9, Sep. 1987, pp. 397-104.
Claim Chart for Proposed Obviousness Rejections based on SE 9700149—claims 1-12 (Reexam Exhibit 8).
Claim Chart for Proposed Obviousness Rejections based on SE 9700149 in view of Monnier and Cook—Claims 13-20 (Reexam Exhibit 9).
Claim Chart for Proposed Obviousness Rejections based on Monnier in view of Miller and Corma—claims 1-12 (Reexam Exhibit 10).
Claim Chart for Proposed Obviousness Rejections based on Monnier, Miller and Corma and Cook—claims 13-20 (Reexam Exhibit 11).
Claim Chart for claim 6, dated Nov. 14, 2012, in Reexamination Control No. 95/002,084.
Clements, "Blending Rules for Formulating Biodiesel Fuel," Proceedings of the Third Liquid Fuel Conference, pp. 44-53, 1996.
Communication of the Board of Appeal (Preliminary Opinion of the Board) in European Patent Application No. 03 793 834.7, dated Jun. 21, 2012.
Cooper, BH; Sogaard-Andersen, P.; Nielsen-Hannerup, P. In *Catalytic Hydroprocessing of Petroleum and Distillates*; Oballa, MC and Shih, SS, Eds.; Marcel Dekker: New York, 1994; pp. 279-290.
Complaint in *Neste Oil Oyj v. Dynamic Fuels, LLC, et al.*, Case No. 12cv00662 (D. Del.) dated May 29, 2012 (Exhibit 16).
Selected Office Action (OAs), responses, and interview summaries of U.S. Appl. No. 12/354,684.
Selected Office Action, responses, and interview summaries of U.S. Appl. No. 10/655,798.
Webpage from Swedish Patent Office showing publication date of Swedish Patent Application No. 9700149 (SE' 149); certified copy of published abstract of SE' 149; certified copy of SE' 149 application.
Corma A. & Martinez A. (1998) "Transformation of Alkanes on Solid Acid and Bifunctional Catalysts" in EG Derouane et al. (Eds.) *Catalytic Activation and Functionalisation of Light Alkanes: Advances and Challenges* (pp. 35-74), Netherlands: Kluwer Academic Publishers. (Reexam Exhibit 6).

(56) References Cited

OTHER PUBLICATIONS

Corrected Second Amendment After Final, Reexam Control No. 90/010,548, dated Apr. 22, 2011.
Criterion Catalysts, "Technical Bulletin: Hydrotreating Catalyst In-Situ Presulphiding Guidelines," Aug. 1998, 9 pages.
Data and graph available from U.S. Energy Information Administration at http://www.eia.gov/dnav/ng/nd_pri_sum_dcu_nus_m.htm.
Database WPI, Week 200357, Derwent Publication Ltd., AN 1997-488372 (Neste II Oy), Abstract 1997.
The Declaration of Dr. Ari Juva dated Nov. 28, 2005 filed in U.S. Pat. No. 7,279,018.
Declaration of Pekka Aalto under 37 C.F.R. § 1.132, dated Mar. 23, 2010, cited in Reexamination Control No. 95/002,084.
Declaration of Dr. Csichery, Reexam Control No. 90/010,548, dated Mar. 20, 2010.
Declaration of P. Aalto with Exhibits, Reexam Control No. 90/010,543, dated Mar. 23, 2010.
Declaration under 37 C.F.R. § 1.132 of Ramin Abhari dated Aug. 17, 2012. including Exhibits A-G (Reexam Exhibit 12).
Declaration of James G. Goodwin, Jr., Ph.D. under 37 C.F.R. § 1.132, dated Nov. 13, 2012, cited in Reexamination Control No. 95/002,084.
Declaration of Pekka Aalto under 37 C.F.R. § 1.132, dated Nov. 14, 2012, in Reexamination Control No. 95/002,084.
Del Gallo et. al. "Comparison of the Effects of Nitrogen Poisoning on Molybdenum Oxycarbide and Pt/B-Zeolite Catalysts in the Isomerization of n-Heptane," Ind. Eng. Chem. Res. 35:3302-3310 (1996).
Dynamic Fuels, About, http://www.dynamicfuelsllc.com/ (last visited Nov. 12, 2012).
Dynamic Fuels, Compare, http://www.dynamicfuelsllc.com/ (last visited Nov. 12, 2012).
Dynamic Fuels, Frequently Ask[ed] Questions, http://dynamicfuelsllc.com/wp-news/frequently-ask-questions/ (last visited Nov. 12, 2012).
Examiner's Answer, Reexam Control No. 90/010,549, dated Aug. 12, 2011.
Exhibits to Appeal Brief, Reexam Control No. 90/010,549, dated Jul. 6, 2011.
Ex Parte Reexamination Certificate ($9162^{nd}$) of U.S. Pat. No. 7,279,018 (U.S. Appl. No. 90/010,549) dated Jul. 31, 2012, (Reexam Exhibit 15).
Feng et al., "Chemical composition of tall oil-based cetane enhancer for diesel fuels," Proc. First Biomass Conference of the Americas, Burlington, Vermont, USA, Aug. 1993. pp. 863-875.
Final Office Action for U.S. Appl. No. 10/655,798, dated Jun. 1, 2005, 6 pp. (Exhibit 5).
Final Office Action, Reexam Control No. 90/010,548, dated Jan. 7, 2011.
First Action Interview Pilot Program Pre-Interview Communication for U.S. Appl. No. 12/354,684, dated Sep. 21, 2011, 4 pp. (Exhibit 3).
Galeana et al. "Thermodynamics of Wax Precipitation in Petroleum Mixtures," AlChE Journal, vol. 42, No. 1, (1996).
Galperin, "Hydroisomerization of N-decane in the presence of sulfur and nitrogen compounds," Applied Catalysis A: General, 209:257-268 (2001).
Goering et al., "Fuel Properties of Eleven Vegetable Oils," Transactions of the ASAE, 1982.
Goodrum et al., "Rheological Characterization of Yellow Grease and Poultry Fat," JAOCS, vol. 79, No. 10 (2002).
R. Groschen, Overview of: The Feasibility of Biodiesel from Waste/Recycled Greases and Animal Fats, Marketing Services Division Minnesota Department of Agriculture, Oct. 2002.
Gusmao et al., "Utilization of Vegetable Oils as an Alternative Source for Diesel-Type Fuel," Catalysis Today, 5:533-544 (1989).
Hawley's Condensed Chemical Dictionary, Twelfth Edition, revised by R.J. Lewis, Sf., Van Nostrand Reinhold, NY (1993), p. 907.

Herrera et al., "Catalyst Selection for Hydrotreating Diesel Fuel From Residue Hydrocracking," ACS Preprints, vol. 37, No. 4, pp. 1855-1863, 1992.
http://www.mansfieldoil.com/latest-news-a-press/524-norfolk-southern-pens-deal-with-dynamic-fuels-and-mansfield-oil.html, dated Nov. 12, 2012.
Huve, "Shell Global Solutions Dewaxing Technologies & Catalysts Current Status,". pp. 1-13.
Information Disclosure Statement and Form 1449, dated Jan. 15, 2009, submitted by Neste during prosecution of U.S. Appl. No. 12/354,684.
Information Disclosure Statements and Forms 1449, dated Sep. 27, 2007 and Mar. 1, 2006, submitted by Neste during prosecution of U.S. Appl. No. 11/852,096 (subsequently abandoned) and U.S. Pat. No. 7,279,018 ('018 patent).
Interview Summary for U.S. Appl. No. 10/655,798, dated Oct. 13, 2005, 2 pp. (Exhibit 5).
Interview Summary for U.S. Appl. No. 10/655,798, dated Feb. 22, 2007, 2 pp. (Exhibit 5).
Interview Summary, Reexam Control No. 90/010,548, dated Feb. 24, 2011.
Interview Summary, Reexam Control No. 90/010,548, dated Apr. 14, 2011.
Interview Summary for U.S. Appl. No. 12/354,684, filed Nov. 9, 2011, 2 pp. (Exhibit 3).
Jan. 7, 2011 Final Rejection, Reexamination Control No. 90/010,549 (Reexam Exhibit 13).
Kirk-Othmer, Encyclopedia of Chemical Technology; $3^{rd}$ Ed. vol. 11, pp. 682-689, and vol. 9, pp. 804-804, published 1980.
Kriz, et al., "Catalysts for the Isomerization of C7 Paraffins". Ind. Eng. Chem. Res. 37:4560-4569 (1998).
Laz'Yan et al. "Production of low-pour diesel fuels by hydroisomerisation of middle distillates from eastern medium-sulfur crudes," Chemistry and Technology of Fuels and Oils; vol. 9, No. 9, pp. 684-688, Sep. 1973, published 1973.
Long et al.,"Noble metal (Pt, Rh, Pd) promoted Fe-ZSM-5 for selective catalytic oxidation of ammonia to $N_2$ at low temperatures," Catalysis Letters vol. 78, Nos. 1-4, Mar. 2002.
MacDonald, "Fuel From Fats," enerG Alternative Sources Magazine (Sep./Oct. 2011).
Miller, "Studies on Wax Isomerization for Lubes and Fuels, Zeolited and Related Microporous Materials: State of the Art in 1994," Studies in Surface Science and Catalysts, 84:2319-2326 (1994).
Mirante et al., "Cloud point prediction of fuels and fuel blends," Fluid Phase Equilibria, 180 (2001) 247-255.
Mochida, Isao et al. , "Two-stage hydrodenitrogenation of heavy distillate in a coal liquid", FUEL, May 1986, vol. 65, pp. 633-635.
Non-Final Office Action for U.S. Appl. No. 10/655,798, dated May 17, 2006, 6 pp. (Exhibit 5).
Non-Final Office Action for U.S. Appl. No. 10/655,798, dated Dec. 18, 2006, 6 pp. (Exhibit 5).
The Notice of Allowance dated Jan. 23, 2007 issued in U.S. Pat. No. 7,232,935.
Nunes et al., "Soybean Oil Hydrocracking Under Pressure: Process and General Aspect of the Transformation", Revue De L'Institut Fransais Du Petrole, vol. 42, No. 3, May-Jun. 1986.
The Office Action dated Oct. 5, 2004 issued in U.S. Pat. No. 7,279,018.
The Office Action dated Jun. 1, 2005 issued in U.S. Pat. No. 7.279,018.
The Office Action dated May 17, 2006 issued in U.S. Pat. No. 7,279,018.
The Office Action dated Aug. 22, 2006 issued in U.S. Pat. No. 7,232,935.
The Office Action dated Dec. 18, 2006 issued in U.S. Pat. No. 7,279,018.
The Office Action dated Feb. 9, 2009 issued in U.S. Pat. No. 7,232,935, now Control No. 90/008,899.
Office Action, Reexam Control No. 90/010,548, dated Oct. 23, 2009.
Office Action issued in co-pending Japanese Application JP-14988 PCT dated May 25, 2010.

(56) References Cited

OTHER PUBLICATIONS

Office Action dated Jun. 24, 2010, issued in U.S. Appl. No. 11/852,096.
Office Communication for U.S. Appl. No. 12/354,684, dated Nov. 10, 2011, 2 pp. (Exhibit 3).
Oilseeds: World Markets and Trade, USDA Foreign Agricultural Service, Jan. 2003.
The Order Granting Reexam dated Feb. 13, 2008 issued in U.S. Pat. No. 7,232,935, now Control No. 90/008,899.
Order granting Request for Reexamination, Reexam Control No. 90/010,548, dated Jul. 16, 2009.
The Petition to make special dated Sep. 22, 2003 filed in U.S. Pat. No. 7,279,018.
Pope et al., "A study of catalyst formulations for isomerization of $C_7$ hydrocarbons," Applied Catalysis A: General 233 (2002) 45-62.
Prakash, A Critical Review of Biodiesel As A Transportation Fuel in Canada (Mar. 25, 1998).
The Preliminary Amendment dated Sep. 5, 2003 filed in U.S. Pat. No. 7,232,935.
The Proposed Agenda for Interview of Apr. 14, 2009 dated Apr. 9, 2009 filed in U.S. Pat. No. 7,232,935, now Control No. 90/008,899.
PTO Form 1449 for U.S. Appl. No. 10/655,798 (issued as U.S. Pat. No. 7,279,018) as filed Mar. 3, 2006, 1 pp. (Exhibit 4).
PTO Form 1449 for U.S. Appl. No. 10/655,798 (issued as U.S. Pat. No. 7,279,018) as filed Dec. 1, 2005, 1 pp. (Exhibit 4).
P. Rahimi and C. Fairbridge, "Effect of Hydrotreating on the Stability of Synthetic Crude from Western Canada," National Centre for Upgrading Technology.
"Recognizing Deactivation Mechanisms in Paraffin Isomerizations," Catalyst Courier, 2006 Issue 64, pp. 10-12.
Reply After Final Under 37 C.F.R. § 1.116 with Juva Declaration for U.S. Appl. No. 10/655,798, filed Dec. 1, 2005, 14 pp. (Exhibit 5).
Reply Brief, Reexam Control No. 90/010,549, dated Oct. 11, 2011.
The Request for Ex Parte Rexexam dated Nov. 7, 2007 filed in U.S. Pat. No. 7,232,935.
Request for Ex Parte Reexamination of U.S. Pat. No. 7,279,018, filed May 22, 2009.
Request for Inter Partes Reexamination of U.S. Pat. No. 8,187,344 dated Aug. 17, 2012.
The Response to Office Action dated Oct. 5, 2004 dated Mar. 7, 2005 filed in U.S. Pat. No. 7,279,018.
The Response to Office Action dated Jun. 1, 2005 dated Dec. 1, 2005 filed in U.S. Pat. No. 7,279,018.
The Response to the Office Action dated May 17, 2006 dated Sep. 18, 2006 filed in U.S. Pat. No. 7,279,018.
Response under 37 CFR §1.111 for U.S. Appl. No. 10/655,798, filed Mar. 19, 2007, 7 pp. (Exhibit 5).
The Response to the Office Action dated Dec. 18, 2006 dated Mar. 19, 2007 filed in U.S. Pat. No. 7,279,018.
Response to Communication Pursuant to Article 96(2) EPC, dated Jan. 16, 2008, submitted during prosecution of European Patent Appl. No. 03793834.7-2104.
The Response dated Apr. 9, 2009 to the Office Action dated Feb. 9, 2009 filed in U.S. Pat. No. 7,232,935, now Control No. 90/008,899.
Ribamar et al., "Vegetable Oil Catalytic Breakdown", Petrobras Technical Bulletin, Rio de Janeiro, 24 (2): 139-147, Apr./Jun. 1981.
Ribamar et al. "Catalytic Decomposition of Vegetable Oil", Applied Catalysis, vol. 5, 1993, pp. 299-308.
Second Declaration of Ramin Abhari under 37 C.F.R. 1,132 with CV (Ex. 14A), dated Dec. 13, 2012.
Sharma and Olson, "Conversion of Fatty Acids and Esters to Low-Aromatic Gasoline," American Chemical Society, Division of Fuel Chemistry (1994), 34(4), 1040-1042, published 1994.
Soveran et al., "The Effect on Diesel Engine Emissions with High Cetane Additives From Biomass Oils," Proc. American Chemical Society (Division of Fuel Chemistry) Meeting San Francisco, CA (Apr. 1992).
Spataru, "Is There A Future for Yellow Grease as a Fuel Additive?", Render 12-14 (Feb. 2001).
Spataru & Monnier, AGTANE (AGricultural ceTANE): An economically viable bioenergy product for compression ignited engines, 5th International Biomass Conference of the Americas (Sep. 21, 2001).
Spatuaru, "AGTANE (Agricultural ceTANE): An economically viable bioenergy product for compression ignited engines," Fuel Chemistry Division Preprints 2002, 47(1), 365.
Speight, JG. "Petroleum Chemistry and Refining," Taylor & Francis, Washington D.C., 1998.
The Statement of Substance of Interview dated May 14, 2009 filed in U.S. Pat. No. 7,232,935, now Control No. 90/008,899.
Stumborg et al., "Hydroprocessed vegetable oils for diesel fuels improvement," Bioresource Technology, vol. 56, 1996, pp. 13-18, Exhibit M of Request for Reexamination of U.S. Pat. No. 7,279,018.
The Summary of Interview dated Feb. 13, 2007 dated Feb. 22, 2007 issued in U.S. Pat. No. 7,279,018.
The Supplemental Response to the Office Action dated Jun. 1, 2005 dated Mar. 1, 2006 filed in U.S. Pat. No. 7,279,018.
Syntroleum Corporation, Form 10-K, Annual Report (2008).
Syntroleum Corporation, Form 10-K, Annual Report (2009).
Syntroleum Corporation, Form 10-Q, 3rd Quarter Report (2012).
Syntroleum webpage; http://www.b2i.us/profiles/investor/fullpage.asp?BzID=2029&to=cp&Nav=0&LangID=1&s=0&ID=11923 (last visited Nov. 12, 2012).
Table 4a. U.S. Crude Oil and Liquid Fuels Supply, Consumption and Inventories, U.S. Energy Information Administration (Dec. 2012).
Table 8.2 from *Riegel's Handbook of Industrial Chemistry, Ninth Edition*, Ed. J.A. Kent, Van Nostrand Reinhold, NY (1992), pp. 278-279.
Third Amendment After Final, Reexam Control No. 90/010,548, dated May 4, 2011.
Third Party Requester Comments filed in Dec. 14, 2012, in Reexamination Control No. 95/002,084.
Tyson et al., "Biomass Oil Analysis: Research Needs and Recommendations," NREL Technical Report, Jun. 2004.
Vajo et al., "Stead-State Decomposition of Ammonia on the Pt (110)-)1x2) Surface," J. Phys. Chem. 1986, 90, 6531-35.
Wong, "ARBO-TANE™, The green diesel fuel," Naval Stores Review, (Jul./Aug. 1991). pp. 14-15.
Wong, A. et al. "Conversion of vegetable oils and animal fats into paraffinic cetane enhacers for diesel fuels," Second Biomass Conference of the Americas: Energy, Environment, Agriculture, and Industry, Aug. 21-24, 1995, pp. 902-905.
Wong et al., Bio-based cetane enhancer for diesel fuels, *Proc. Bioenergy '98 Conference*, Madison, Wisconsin, USA, Oct. 1998.
Wong et al., "A green approach for the production of bio-cetane enhancer for diesel fuels," Proc. 4th Biomass Conference of the Americas, Oakland, California; USA, Sep. 1999.
Bell et al., TEAM Report for Imperial Oil: Biodiesel (2007).
Craig & Coxworth, Conversion of Vegetable Oils to Conventional Liquid Fuel Extenders, in Sixth Canadian Bioenergy R&D Seminar, 407-411 (1987).
Craig & Coxworth, A Marketing Survey of Worldwide Potential for Use of Vegetable Oil Conversion Products in Diesel Fuel, SRC Publication No. R-1520-2-C-89 (Oct. 1989).
Natural Resources Canada, Canmet ENERGY's SuperCetane Technology, http://cetc-varennes.nrcan.gc.ca/eng/industrial processes/industrial energy systems (Nov. 11, 2008), last visited Jul. 19, 2013.
Chemeo, Properties of Isononane, http://chemeo.com/cid/73-453-8 (accessed Aug. 23, 2013).
Goodfellow, Animal-Fat Based Biodiesel: Explore Its Untapped Potential, Biodiesel Magazine, Mar. 2009.
Goodfellow et al., Biofuel Production From Animal Fats: A North American Perspective (May 22, 2012), available at http://www.calameo.com/books/0014209045468be75733c.
Ghosh & Jaffe, Detailed Composition-Based Model for Predicting the Cetane Number of Diesel Fuels, Ind. Eng. Chem. Res. 45:346-351 (2006).
Lira-Galeana et al., Thermodynamics of Wax Precipitation in Petroleum Mixtures, AIChE J. 42(1):239-248 (1996).

(56) References Cited

OTHER PUBLICATIONS

Declaration of Jacques Monnier under 37 C.F.R. § 1.132, dated Jan. 7, 2010, filed in U.S. Appl. No. 11/234,175, which issued as Monnier '931.
American Petroleum Institute, Properties of Hydrocarbons of High Molecular Weight Synthesized by Research Project 42 of the American Petroleum Institute, 1-3 (1967).
Neste Oil, NExBTL Renewable Synthetic Diesel, Cal Hodge handout presented at Climate Action Team Technology Symposium, Sacramento, California, Jun. 27-28, 2006, available at http://www.climatechange.ca.gov/events/2006-06-27+28_symposium/presentations/ (last modified May 7, 2008).
Sandler, Chemical and Engineering Thermodynamics, at 1-3, 324-333, 598-603 (3d Ed. 1999).
Santana et al., Evaluation of different reaction strategies for the improvement of cetane number in diesel fuels, Fuel 85:643-656 (2006).
Smith, Van Ness, and Abbott, Introduction to Chemical Engineering Thermodynamics, at 526-531 (5th Ed. 1996).
Spataru, AGTANE (Agricultural ceTANE): An economically viable bioenergy product for compression ignited engines, Fuel Chemistry Division Preprints, 47(1):365 (2002).
Stumborg et al., Catalytic Conversion of Vegetable Oils to Diesel Additives, in Energy From Biomass and Wastes XVI, 721-738 (1993).
Stumborg et al., Hydroprocessed Vegetable Oils for Diesel Fuel Improvement, in Liquid Fuels, Lubricants and Additives from Biomass, Proceedings of an Alternative Energy Conference, Kansas City, Missouri, held Jun. 16-17, 1994, 157-165 (1994).
Syntroleum Corporation, SEC Form 8-K, filed Aug. 8, 2013 for the Period Ending Aug. 7, 2013.
Tampier et al., Identifying Environmentally Preferable Uses for Biomass Resources, Ch. 4 (Mar. 31, 2004).
File History of U.S. Appl. No. 08/269,090 to Monnier et al. (filed Jun. 30, 1994).
File History of U.S. Appl. No. 08/517,421 to Monnier et al. (filed Aug. 21, 1995).
Widmor et al., Prediction of the Freeze Point Temperature of Jet Fuel Using a Thermodynamic Model, Petroleum Chem. Div. Preprints 47(3):239-242 (2002).
Wong, Tall Oil-Based Cetane Enhancer for Diesel Fuel, in 79th Annual Meeting, Technical Section, Canadian Pulp and Paper Association, Preprints "A", A313-A318, held Jan. 26-27, 1993.
Wong et al., Technical and Economic Aspects of Manufacturing Cetane-Enhanced Diesel Fuel from Canola Oil, Bio-Oils Symposium, Saskatoon, Saskatchewan, held Mar. 2 & 3, 1994.
Hammami et al., Cloud Points: Can We Measure or Model Them?, Petroleum Science and Technology 21(3-4):345-358 (2003).
Mirante & Coutinho, Cloud point prediction of fuels and fuel blends, Fluid Phase Equilibria 180:247-255 (2001).
Long & Stevenson, A Simple Test to Detect Chlorophyll in Tallow, Presented Before the $8^{th}$ Annual Fall Meeting—A.O.C.S. 7-8 (Jan. 1935).
Michael J. Haas, Animal Fats, Ch. 5 in Bailey's Industrial Oil and Fat Products, 161-212 ($6^{th}$ ed. 2005).
Latondress, Refining, Bleaching, and Hydrogenating Meat Fats, JAOCS 62(4):812-815 (Apr. 1985).
He & Van Gerpen, Biodiesel Quality Affected by Sulfur Content Originated by Different Feedstocks and a Database for the Same, Final Report KLK432 N08-04, National Institute for Advanced Transportation Technology, University of Idaho (Feb. 2008).
Ali et al., Mineral Composition, Quality and Physico-chemical Parameters of the Local Tallow of Pakistan, Pakistan Journal of Nutrition 7(5):717-720 (2008).
Canmet '95, New Process Yields Cleaner Diesel (1995).
Wong & Hogan, Bio-Based Cetane Enhancer for Diesel Fuels, BioEnergy '98: Expanding BioEnergy Partnerships, 1042-1052 (1998).

Leng et al., Catalytic Conversion of Palm Oil to Fuels and Chemicals, The Canadian Journal of Chemical Engineering 77:156-162 (Feb. 1999).
Elliot & Baker, Hydrodeoxygenation of Wood-Derived Liquids to Produce Hydrocarbon Fuels, Proceedings of the 20th Intersociety Energy Conversion Engineering Conference 1:586-592 (Aug. 1985).
Held et al., Production of Hydrocarbons fro Biomass, Energy from Biomass $3^{rd}$ E.C. Conference, 744-748 (1985).
Action Closing Prosecution in Reexamination Control No. 95/002,084, dated Jun. 26, 2013.
Patent Owner Comments after Action Closing Prosecution in Reexamination Control No. 95/002,084, filed Aug. 26, 2013.
Declaration of Dr. Michael T. Klein filed with Patent Owner Comments after Action Closing Prosecution in Reexamination Control No. 95/002,084, filed Aug. 26, 2013, signed Aug. 23, 2013 (Exhibit P2).
Declaration of Dr. Stephen Pietsch filed with Patent Owner Comments after Action Closing Prosecution in Reexamination Control No. 95/002,084, filed Aug. 26, 2013, signed Aug. 22, 2013 (Exhibit P1).
Third Declaration of Ramin Abhari under 37 C.F.R. § 1.132, dated Sep. 23, 2013 (Exhibit 1).
Declaration of Dr. Edward L. Sughrue under 37 C.F.R. § 1.132, dated Sep. 23, 2013 (Exhibit 2).
J. Johnson, et al., "Emissions from Fischer-Tropsch Diesel Fuels," SAE Technical Paper 2001-01-3518 (published Sep. 24, 2001). (Exhibit 3).
L. Rantanen, R. Linnaila, P. Aakko, and T. Harju, "NExBTL—Biodiesel Fuel of the Next Generation," SAE Technical Paper 2005-01-3771 (published Oct. 24, 2005). (Exhibit 5).
B. B. He and J. Van Gerpen, "Biodiesel Quality Affected by Sulfur Content Originated by Different Feedstocks and a Database for the Same," Final Report KLK432 N08-04, National Institute for Advanced Transportation Technology, University of Idaho (Feb. 2008). (Exhibit 6).
Laurent, et al., "Study of the hydrodeoxygenation of carbonyl, carboxylic and guaiacyl groups over sulfided CoMo/γ-Al2O3 and NiMo/ γ-Al2O3 catalyst," Applied Catalysis A 109, pp. 97-115 (1994) (Exhibit 7).
L.G. Huve, "Shell Global Solutions Dewaxing Technologies & Catalysts Current Status" pp. 1-13 (Exhibit 9).
A. Gorshteyn, P. Kamienski, T. Davis, W. Novak, and M. Lee, "Exxon Mobil Catalytic Dewaxing—A Commercial Proven Technology," Paper presented at the 2nd Russian Refining Technology Conference, Moscow, Sep. 26-27 (2002), 13 pages. (Exhibit 11).
ASTM International, Designation: D6751-11 b, "Standard Specification for Biodiesel Fuel Blend Stock (B1 00) for Middle Distillate Fuels," Jul. 2011, pp. 1083-1091. (Exhibit 12).
Satterfield, C.N., Heterogeneous Catalysis in Industrial Practice, 2nd Edition, Sections 9.8-9.11, McGraw-Hill, Inc., NY (1991), pp. 375-389. (Exhibit 13).
Latondress, E.G., "Refining, Bleaching, and Hydrogenating Meat Fats," JAOCS 62(4), pp. 812-815 (Apr. 1985). (Exhibit 14).
Information Disclosure Statement and Form 1449, dated May 26, 2009, submitted by Neste during prosecution of U.S. Appl. No. 12/354,634. (Exhibit 15).
Affens, et al., "Effect of Composition on Freezing Points of Model Hydrocarbon Fuels," presented before the Division of Fuel Chemistry, American Chemical Society, New York, Aug. 1981, 9 pages, available at https://web.an l.gov/PCS/acsfuel/preprint%20arch ive/Files/26 3 N EW%20YORK_08-81_0178.Pdf (subsequently published in Fuel, 63(4 ), Apr. 1984, pp. 543-547) (Exhibit R3).
Beare-Rogers, J. et al., "Lexicon of Lipid Nutrition," Pure and Applied Chemistry, vol. 73, No. 4, 2001, pp. 685-744. (Exhibit R19).
European Committee for Standardization (CEN), "Automotive fuels—Paraffinic diesel from synthesis or hydrotreatment—Requirements and test methods," TC WI WS038: 2009 (E), 10 pages.
European Food Safety Authority, "Scientific Opinion on the re-evaluation of candelilla wax (E 902) as a food additive," EFSA Journal 2012;10(11 ): 2946 (published Jan. 28, 2013), 27 pages.
European Standard EN 590:2004, "Automotive Fuels—Diesel—Requirements and Test Methods," Swedish Standards Institute,

(56) References Cited

OTHER PUBLICATIONS

2004, English version, available at http://www.repsol.com/imagenes/es _gi/EN%20590 04 93548 tcm10-67163.pdf, 13 pages.
Exxon Mobil, "Material Safety Data Sheet—ISOPAR M FLUID," 2002 (Revised 2007, 2008), 10 pages.
Exxon Mobil Chemical, "Product Safety Summary—ISOPAR™ M FLUID," 2011, 3 pages. (Exhibit R10).
Filter Manufacturers Council, "Solving Winter Diesel Fuel / Fuel Filter Problems," Technical Service Bulletin 91-1 R3, 1991 (Revised 2006), available at http://www.hastingsfilter.com/Literature/TSB/91-1R3.pdf, 2 pages. (Exhibit R14).
Fourth Declaration of Ramin Abhari under 37 C.F.R. § 1.132 dated Mar. 14, 2014 ("4th Abhari Declaration"). (Exhibit R1).
Griesbaum, et al., "Hydrocarbons," Ullmann's Encyclopedia of Industrial Chemistry, 2000, 61 pages. (Exhibit R12).
Gunstone, F.D., et al., "The Lipid Handbook," Ch. 3 & 6, Chapman & Hall, Second Edition, 1994, 223 pages. (Exhibit R7).
Lange, N.A., "Lange's Handbook of Chemistry," (Ed. Dean, J.A.), Thirteenth Edition, 1985, pp. 7.375 & 7.626. (Exhibit R13).
Rantanen, et al., "NExBTL—Biodiesel Fuel of the Second Generation," SAE Technical Paper 2005-01-3771 (published Oct. 24, 2005), 17 pages.
Second Declaration of Dr. Edward L. Sughrue under 37 C.F.R. § 1.132 dated Jan. 13, 2014 ("2nd Sughrue Declaration"). (Exhibit R2).
Sinha, et al., "Hydroisomerization of n-Aikanes over Pt-SAP0-11 and Pt-SAP0-31 Synthesized from Aqueous and Nonaqueous Media," Ind. Eng. Chem. Res., 1998, 37 (6), pp. 2208-2214. (Exhibit R18).
Specification, Claims, and Abstract as Filed Jan. 15, 2009 in U.S. Appl. No. 12/354,634 to Jakkula, 12 pages. (Exhibit R6).
Supplemental Preliminary Amendment in U.S. Appl. No. 12/354,634 to Jakkula dated Jun. 14, 2011, 6 pages. (Exhibit R5).
TCI America, "Material Safety Data Sheet—5-Methylnonane," 2010, 3 pages. (Exhibit R11).
Wong, et al., "Bio-Based Cetane Enhancer for Diesel Fuels," BioEnergy 1998: Great Lakes Regional Biomass Energy Program, 12 pages. (Exhibit R17).
Lewis, R.J., *Hawley's Condensed Chemical Dictionary*, John Wiley & Sons, Inc., 629 (1997).
*Syntroleum Corp. v. Neste Oil OYJ*, Decision, Institution of Inter Partes Review, Case IPR2013-00178 (MT), U.S. Pat. No. 8,212,094, 1-26 (2013).
Kent, J.A., "Fatty Acid Composition of Some Edible Oils and Fats," *Riegel's Handbook of Industrial Chemistry*, Van Nostrand Reinhold, 278-279 (1992).
Pearl, G.G., "Animal Fats and Recycled Cooking Oil," *Fats and Proteins Research Foundation, Inc.—Director's Digest* 366: 1-10 (2001).
Rius, M.A., et al., "Influence of volatile compounds on the development of off-flavours in pig back fat samples classified with boar taint by a test panel," *Meat Science* 71: 595-602 (2005).
Madl, T, et al., "Quantification of primary fatty acid amides in commercial tallow and tallow fatty acid methyl esters by HPLC-APCI-MS", *Analyst* 130: 565-570 (2005).
He, B.B., et al., "Sulfur Content in Selected Oils and Fats and Their Corresponding Methyl Esters," *Applied Engineering in Agriculture* 25(2): 223-226 (2009).
Taravus, S., et al., Alkali-Catalyzed Biodiesel Production from Mixtures of Sunflower Oil and Beef Tallow, *Energy & Fuels* 23: 4112-4115 (2009).
Canoira, L., et al., "Biodiesel from Low-Grade Animal Fat: Production Process Assessment and Biodiesel Properties Characterization," *Ind. Eng. Chem. Res.* 47: 7997-8004 (2008).
Lapuerta, M., et al., "Biodiesel from Low-Grade Animal Fats: Diesel Engine Performance and Emissions," *Energy & Fuels* 23: 121-129 (2009).
Agarwal, P., et al., "Comparative Studies on the Bio-desulfurization of Crude Oil with Other Desulfurization Techniques and Deep Desulfurization through Integrated Processes," *Energy Fuels* 24: 518-524 (2010).

Kim, M., et al., "Performance of heterogeneous $ZrO_2$ supported metaloxide catalysts for brown grease esterification and sulfur removal," *Bioresource Technology* 102: 2380-2386 (2011).
Canakci, M., "The potential of restaurant waste lipids as biodiesel feedstocks," *Bioresource Technology* 98: 183-190 (2007).
Klimmek, H., "Influence of Various Catalyst Poisons and Other Impurities on Fatty Acid Hydrogenation," *JAOCS* 61(2): 200-204 (1984).
Kincs, F.R., "Meat Fat Formulation," *JAOCS* 62(4): 815-818 (1985).
Pearl, G.G., "Feeding Fats," *Fats and Proteins Research Foundation, Inc.—Director's Digest* 269: 1-23 (1995).
Iki, H., et al., "Applicability of Hydrogenated Palm Oil for Automotive Fuels," $16^{th}$ *Saudi Arabia-Japan Joint Symposium—Central Technology Laboratory, Nippon Oil Corporation*, 1-10 (2006).
AIChE, "Exxon mobile Midw™ Process—Technology and Commercial Experiences for Production of Low-Cloud Point Ulsd," (2008) http://www.aiche-fpd.org/listing/03.pdf.
Bartholomew, C.H., et al., "Sulfur Poisoning of Metals," *Advances in Catalysis* 31: 135-242 (1982).
Bridgwater, A.V., "Catalysis in thermal biomass conversion," *Applied Catalysis A* 116:5-47 (1994).
Broderick, D.H., et al., "The Sulfided Co—Mo/γ-$Al_2O_3$ Catalyst: Evidence of Structural Changes during Hydrodesulfurization of Dibenzothiophene," *Journal of Catalysis* 54: 94-97 (1978).
Declaration, Johannes A. Lercher, executed Jul. 11, 2013.
Declaration, Enrique Iglesia, executed Aug. 11, 2013.
Declaration, Johannes A. Lercher, executed Apr. 12, 2012.
Declaration, Stephen Pietsch, executed Apr. 25, 2013.
Second Declaration of Dr. Michael T. Klein, Exhibit P36 (Feb. 12, 2014).
Comparison of Corma Table 14 to S.J. Miller, Exhibit P30 (2014).
Third Party Requester Comments after Action Closing Prosecution in Control No. 95/002,084 filed Sep. 24, 2013.
Petition Decision in connection with Control No. 95/002,084 mailed Jan. 13, 2014.
Patent Owner Supplemental Comments after Action Closing Prosecution in Control No. 95/002,084 filed Feb. 12, 2014.
Third Party Requester Supplemental Comments after Action Closing Prosecution in Control No. 95/002,084 filed Mar. 14, 2014.
Replacement Third Party Requester Supplemental Comments after Action Closing Prosecution in Control No. 95/002,084 filed Apr. 11, 2014.
Replacement Patent Owner Supplemental Comments after Action Closing Prosecution in Control No. 95/002,084 filed Apr. 17, 2014.
Third Party Requester Comments to Replacement Patent Owner Supplemental Comments after Action Closing Prosecution in Control No. 95/002,084 filed May 16, 2014.
Action Closing Prosecution (non-final) in Control No. 95/002,084 mailed Jun. 25, 2014.
Declaration in a Civil Action of the Finnish National Board of Patents and Registration, Helsinki District Court, Litigation 12/64638, Jun. 6, 2014.
Translation of Declaration in a Civil Action of the Finnish National Board of Patents and Registration, Helsinki District Court, Litigation 12/64638, Jun. 6, 2014.
Shih, S and Gorshteyn, A, "ExxonMobil MIDW™ Process—Technology and Commercial Experiences for Production of Low-Cloud Point ULSD," AICHE (2008) http://www3.aiche.org/proceedings/Abstract.aspx?PaperiD=109650.
ASTM D975-98b, Feb. 1999 (Ex. R21 in Control No. 95/002,084).
Carter et al., Investigation of the Ozone Formation Potentials of EXXSOL® D95, ISOPAR-M®, and the EXXATE® Fluids, Report OO-AP-RT3L-001-FR to ExxonMobil Corporation (2000) (Ex. P37 in Control No. 95/002,084).
CRC Handbook of Chemistry and Physics, 67th Ed., CRC Press, Inc., 1986, pp. C-254 and C-530 (Ex. R22 in Control No. 95/002,084).
Deposition Transcript of Harold Henry Lamb, Jr., Ph.D., in IPR 2013-00578 for U.S. Pat. No. 8,231,804, Exhibit 1140 (Sep. 25, 2014).
Fifth Declaration of Ramin Abhari under 37 C.F.R. § 1.132 in Control No. 95/002,084 dated Oct. 24, 2014 (Ex. R19 in Control No. 95/002,084).

(56) References Cited

OTHER PUBLICATIONS

Isoparaffinic Hydrocarbon, Technical Evaluation Report for the USDA National Organic Program (2008) (Ex. P38 in Control No. 95/002,084).
Madl, et al., "Quantification of primary fatty acid amides in commercial tallow and tallow fatty acid methyl esters by HPLC-APCI-MS", *Analyst* 130: 565-570 (2005).
Needham et al., Molecular Modeling of the Physical Properties of the Alkanes, J. Am. Chem. SOC. 1988, 110, 4186-4194 (1988).
Order Granting Request for Ex Parte Reexamination of U.S. Pat. No. 7,279,018 in Control No. 90/010,549 mailed Jul. 16, 2009.
Order Granting Request for Inter Partes Reexamination of U.S. Pat. No. 8,187,344 and Inter Partes Reexamination Communication mailed Sep. 14, 2012 in Control No. 95/002,084.
Syntroleum Corporation, Form 10-K, Annual Report (2012).
Third Declaration of Dr. Edward L. Sughrue under 37 C.F.R. § 1.132 in Control No. 95/002,084 dated Oct. 24, 2014 (Ex. R20 in Control No. 95/002,084).
Third Declaration of Dr. Michael T. Klein, Sc.D., in Control No. 95/002,084 dated Sep. 25, 2014 (Ex. P39 in Control No. 95/002,084).
Third Party Requester Comments filed in Control No. 95/002,084 on Oct. 24, 2014.
U.S. Natural Gas Wellhead Price Data and Graph from U.S. Energy Information Administration, released Nov. 30, 2012, 1 pp; Available for download at http://www.eia.gov/dnav/ng/ng_pri_sum_dcu_nus_m.htm (Exhibit 15 in Control No. 95/002,084).
Right of Appeal Notice in Control No. 95/002,084 (Nov. 14, 2014).
Neste Appeal Brief in Control No. 95/002,084 (Feb. 18, 2015).
REG Third Party Requester Respondent Brief in Control No. 95/002,084 (Mar. 18, 2015).
Examiner's Answer in Control No. 95/002,084 (Apr. 29, 2015).
James A. Duffield and Hosein Shapouri, "Biodiesel Development: New Markets for Conventional and Genetically Modified Agricultural Products," Agricultural Economic Report No. (AER-770) 35 pp, Sep. 1998.
Neste Rebuttal Brief in Control No. 95/002,084 (May 29, 2015).
Reexam Control No. 95/002,084, Patent Owner's Request for Rehearing (Oct. 28, 2016).
Reexam Control No. 95/002,084, Respondent's Comments in Opposition of Patent Owner's Request for Rehearing Under 37 C.F.R. § 41.79 (Nov. 28, 2016).
Reexam Control No. 95/002,084, Decision on Appeal (Sep. 28, 2016).
Reexam Control No. 95/002,084, Oral Hearing Transcript (May 12, 2016).
Riegel's Handbook of Industrial Chemistry, Ninth Edition, (Ed. James A. Kent), pp. 278-279 (1992).
Vickers, Allen, Higher-Temperature Simulated Distillation with DB-ST Sim Dis Columns, https://www.agilent.com/cs/library/applications/5988-7929EN.pdf at 2 (Oct. 31, 2002) ("Vickers").
Academic Press Dictionary Science and Technology, pp. 77 and 2301 (1992).
BPAI Decision on Rehearing, *REG Synthetic Fuels, LLC* v. *Patent of Neste Oil OYJ*, Appeal No. 2016-001900, Reexamination Control No. 95/0002,084, U.S. Pat. No. 8,187,344 B2 mailed Nov. 30, 2017.
Kirk-Other, Encyclopedia of Chemical Technology, $3^{rd}$ Ed. vol. 4, pp. 859-860 (1980).
Robert Thorton Morrison & Robert Neilson Boyd, Organic Chemistry ($3^{rd}$ ed. 1973).
PerkinElmer, Differentiation Between Fossil and Biofuels by Liquid Scintillation Beta Spectrometry—Direct Method (2009).
American Society for Testing and Materials [ASTM]. vol. 8.03. Method D6866-06. Standard Test Methods for Determining the Biobased Content of Natural Range Materials Using Radiocarbon and Isotope Ratio Mass Spectrometry Analysis, 2006.
Summons, Opposition of European Pat. App. No. 14 711 966.3 (May 7, 2019).
Bacha et al., Chevron Corp., "Diesel Fuels Technical Review" (2007).

\* cited by examiner

FUEL COMPOSITION FOR A DIESEL ENGINE

This is a continuation of application Ser. No. 13/480,562 filed May 25, 2012, which continuation of application Ser. No. 12/354,634, filed Jan. 15, 2009, now U.S. Pat. No. 8,187,344, issued May 29, 2012, which is a divisional application of U.S. application Ser. No. 11/852,096, filed on Sep. 7, 2007, now abandoned, which is a continuation application of U.S. application Ser. No. 10/655,798, filed on Sep. 5, 2003, now U.S. Pat. No. 7,279,018, issued Oct. 9, 2007, which claims the benefit of priority of U.S. Application No. 60/408,302, filed on Sep. 6, 2002 under 35 U.S.C. § 119. The contents of all applications in their entireties are incorporated herein by reference.

TECHNICAL FIELD

The present invention relates to a fuel composition for diesel engines, comprising components based on vegetable oil and/or animal fat and/or fish oil, diesel components based on crude oil and/or fractions from Fischer-Tropsch process, and optionally components containing oxygen.

PRIOR ART

Currently used fuels for diesel engines mainly contain components from crude oil. The aim of the climate agreement of Kyoto is to eliminate detrimental influences due to human activities on the atmosphere, and thus on the climate. The EU has agreed on reducing emissions of carbon dioxide, methane and other greenhouse gases by eight percent until 2010, starting from the levels of 1990. One of the objects of the EU agricultural policy is to find uses for agricultural overproduction, and to increase the self-sufficiency for fuels. Accordingly, an EU directive is being prepared, demanding that at least two percent of the petrol and diesel fuel consumed in 2005 should be of biological origin. It is anticipated that one of the requirements of this directive is to increase the proportion of biocomponents to about six percent until 2010. The directive will be validated in all EU countries in the near future.

At the moment, the most common component of biological origin in fuels is rapeseed oil methyl ester, referred to as RME. RME is either used as such or as a mixture with fuels. Drawbacks of RME are its poor miscibility with diesel fuels, and, in comparison to a conventional diesel fuel (EN 590), particularly under low temperature conditions, its poor storage stability and poor performance at low temperatures. Moreover, it causes engine fouling and increases emissions of nitrogen oxides (NOx). A by-product of the production process of RME is glycerol, which may become a problem when high amounts of the product are produced. Esters of other vegetable oils may be produced in similar manner, and methyl esters of fatty acids are generally known as FAMEs (fatty acid methyl ester). These FAMEs may be used in similar applications as the rapeseed oil methyl ester, but they also have a negative effect on the quality of the diesel fuel, particularly with respect to the performance thereof at low temperatures, and in addition, the use thereof in fuels increases the emissions of nitrogen oxides. In some cases FAME and RME cause higher particle emissions and smoke development of the cold driven engine.

Vegetable oils and animal fats may be processed to decompose the ester and/or fatty acid structure and to saturate the double bonds of the hydrocarbon chains, thus obtaining about 80 to 85% of n-paraffin product relative to the mass of the starting material. This product may be directly mixed with a diesel fuel, but a problem with the fuel so produced is its poor performance at low temperatures. In addition, n-paraffins having a carbon number of fatty acids are waxy with a high solidification point, typically above +10° C., thus limiting the use of these compounds in diesel fuels at least at low temperatures.

WO 2001049812 discloses a method for producing a diesel fuel with a molar ratio of iso-paraffins to n-paraffins of at least 21:1. In the method, a feed stock containing at least 50% of C10-paraffins is contacted with a catalyst in the isomerization reaction zone.

WO 2001012581 discloses a method for producing methyl esters useful as biological diesel fuel, wherein mixtures of fatty acids and triglycerides are esterified in one phase. In this method, a solution is formed from fatty acids, triglycerides, alcohol, acid catalyst and co-solvents at a temperature below the boiling point of the solution. A co-solvent is used in amounts to provide a single phase, then the solution is maintained for a period of time sufficient for the acid catalyzed esterification of the fatty acids to take place. Thereafter, the acid catalyst is neutralized, a base catalyst is added to transesterify the triglycerides, and finally, the esters are separated from the solution. Thus a biofuel containing esters is obtained, having a glycerol content of less than 0.4% by weight U.S. Pat. No. 6,174,501 presents a method for producing oxidized diesel fuel of biological origin. This oxidized biological diesel fuel comprises a mixture of transesterified triglycerides.

FI 100248 describes a two-step process for producing middle distillate from vegetable oil by hydrogenating fatty acids of the vegetable oil, or triglycerides, to give n-paraffins, and then by isomerizing the n-paraffins to give branched-chain paraffin-Any gases, liquid droplets and solid particles present in the atmosphere in amounts being hazardous to human health and/or having a detrimental effect on animals, plants and different materials, are considered as air pollutants. Air pollution mainly originates from three main emission sources, i.e., the industry, energy production, and traffic.

The harmfulness of particle emissions is caused by the substances and compounds they carry, such as heavy metals and other carcinogenic and mutagenic compounds. Particles present in exhaust gases are small and thus hazardous to health.

Greenhouse gases allow for the penetration of the radiation from the sun to reach the earth, preventing, however, the thermal radiation from escaping from the earth back to space. They thus contribute to the warming of the earth. One of the most significant greenhouse gases is carbon dioxide released, for instance, during the combustion of fossil fuels.

Nitrogen oxides are acidifying compounds. This acidification may, for instance, lead to plant damages and species changes in surface waters. Nitrogen oxides may also react with oxygen to give ozone. This phenomenon contributes particularly to air quality in cities.

As the above teachings indicate, there is a need for a high quality fuel composition for diesel engines containing components of biological origin and also meeting the quality requirements for diesel fuels under low temperature operation conditions. Moreover, the fuel should be more environmentally friendly than prior art solutions.

GENERAL DESCRIPTION OF THE INVENTION

The object of the invention is to provide a more environmentally friendly fuel composition for diesel engines containing components of biological origin, and also meeting the quality requirements for diesel fuels under low temperature conditions.

The fuel composition for diesel engines of the invention, containing components of biological origin, comprises at least one component produced from a biological starting material obtained from plants, animals or fish, diesel components based on crude oil and/or fractions from Fischer-Tropsch process, and optionally components containing oxygen.

The characteristic features of the fuel composition for diesel engines containing components of biological origin are presented in the appended claims.

DETAILED DESCRIPTION A OF THE INVENTION

It was surprisingly found that the diesel fuel composition of the invention, containing components of biological origin, also meets the quality requirements for diesel fuels under low temperature conditions. The composition of the diesel fuel of the invention comprises the following:

a) 0.1 to 99% by volume, preferably 0.1 to 80% by volume of a component or a mixture of components produced from biological raw material originating from plants and/or animals and/or fish;

b) 0 to 20% by volume of components containing oxygen selected from the group consisting of aliphatic alcohols such as methanol and ethanol, ethers, fatty acid esters such as methyl and ethyl esters, water, and mixtures containing the same; both components a) and b) being mixed as an emulsion or dissolved in diesel components based on crude oil and/or fractions from Fischer-Tropsch process.

Component a) produced from biological raw material originating from plants and/or animals and/or fish, referred to as the biological component in the present specification, is obtained by hydrogenating and decomposing fatty acids and/or fatty acid esters to give a hydrocarbon having a carbon number of 6-24, typically n-paraffin as the product having a carbon number of 12-24, and optionally by isomerizing the hydrocarbon, typically n-paraffin, thus obtained to give isoparaffin. The hydrocarbon is preferably isomerized.

The biological raw material originating from plants and/or animals and/or fish is selected from the group consisting of vegetable oils, animal fats, fish oils and mixtures thereof containing fatty acids and/or fatty acid esters. Examples of suitable materials are wood-based and other plant-based fats and oils such as rapeseed oil, colza oil, canola oil, tall oil, sunflower oil, soybean oil, hempseed oil, olive oil, linseed oil, mustard oil, palm oil, peanut oil, castor oil, coconut oil, as well as fats contained in plants bred by means of gene manipulation, animal-based fats such as lard, tallow, train oil, and fats contained in milk, as well as recycled fats of the food industry and mixtures of the above.

The basic component of a typical vegetable or animal fat is triglyceride i.e., a triester of glycerol and three fatty acid molecules having the structure presented in the following formula I:

where RI, R2, and R3 are hydrocarbon chains, and R, R2, and R3 may be saturated or unsaturated C6-C24 alkyl groups. The fatty acid composition may vary considerably in biological raw materials of different origin.

n-paraffin, iso-paraffin or mixtures thereof produced from the biological raw material may be used as a diesel fuel component in accordance with the properties desired for the diesel fuel. Fractions from Fischer-Tropsch-process typically contain high levels of n-paraffin and, optionally, they may be isomerized either simultaneously during the processing of the

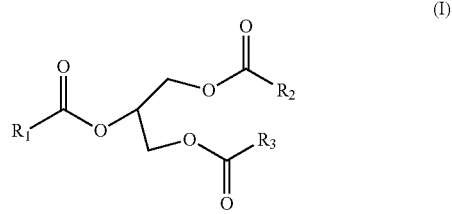

component of biological origin or separately therefrom, or they may be used as such.

The biological component may be produced, for instance, with a process comprising at least two steps and optionally utilizing the counter-current operation principle. In the first hydrodeoxygenation step of the process, optionally running counter-current, the structure of the biological raw material is broken, compounds containing oxygen, nitrogen, phosphor and sulphur as well as light hydrocarbons as gas are removed, and thereafter, olefinic bonds are hydrogenated. In the second isomerization step of the process, optionally running counter-current, isomerization is carried out to give branched hydrocarbon chains, thus improving the low temperature properties of the paraffin.

Biological raw material originating from plants, animals or fish and containing fatty acids and/or fatty acid esters, selected from vegetable oils, animal fats, fish oils and mixtures thereof, is used as the feed stock.

High quality hydrocarbon component of biological origin, particularly useful as a component of a diesel fuel, as an isoparaffinic solvent and as a lamp oil, is obtained as the product having a high cetane number that may even be higher than 70. Also, with a turbidity point lower than −30° C. a cetane number higher than 60 can still be achieved. The process can be adjusted according to the desired cetane number and turbidity point.

Advantages of the diesel fuel composition of the present invention include superior performance at low temperatures and an excellent cetane number compared to solutions of prior art using FAME-based components like RME. Problems associated with the performance at low temperatures may be avoided by isomerizing waxy n-paraffins having a carbon number comparable with that of fatty acids to give isoparaffins. The properties of the products thus obtained are excellent, especially with respect to diesel applications, the n-paraffins typically have cetane numbers higher than 70, and isoparaffins higher than 60, and thus they have an improving effect on the cetane number of the diesel pool, which clearly makes them more valuable as diesel components. Moreover, the turbidity point of the isomerized product may be adjusted to the desired level, for example below −30° C., whereas the corresponding value is about 0° C. for RME and more than +15° C. for n-paraffins. Table 1 below compares the properties of an isomerized biological component, RME, and a commercial diesel fuel.

TABLE 1

| Product | Density (kg/m³) | Cetane number | Turbidity point (° C.) |
|---|---|---|---|
| Isomerized biological component | C 800 | >60 | −30 |
| RME | −880 | −50 | −0 |
| Diesel fuel EN 590 | 820-845 | >51 | 0 to −15 |

Fouling of engines is considerably diminished and the noise level is clearly lower when using the diesel fuel composition of the invention in comparison with similar prior art fuels of biological origin containing FAME components, and further, the density of the composition is lower. The composition does not require any modifications of the automobile technology or logistics. Higher energy content per unit volume may be mentioned as a further advantage compared to RME.

The properties of the diesel fuel composition of biological origin according to the invention correspond to those of a high quality diesel fuel based on crude oil, it is free of aromates and, in contrast to FAME, it leaves no impurity residues.

Nitrogen oxide emissions due to the fuel composition of the invention are lower that those from a similar FAME-based product, and further, the particle emissions are clearly lower, and the carbon portion of the particles is smaller. These significant improvements in the emissions of the fuel composition of biological origin are environmentally very important.

The invention will now be illustrated by means of the following examples without intending to limit the scope thereof.

EXAMPLES

Example 1

The following Table 2 compares the emission characteristics of a conventional diesel fuel used in Europe in summer, EN 590 (DI), to those of a composition containing 60% by volume of hydrogenated and isomerized tall oil (TOFA), and 40% by volume of the European summer diesel fuel EN 590.

TABLE 2

| Characteristic | Unit | 60% b.v. TOFA + 40% b.v. DI | DI |
|---|---|---|---|
| Turbidity point | ° C. | −15 | −8 |
| Cetane number | | 61.2 | 55.9 |
| Aromates | % b.w. | 8.7 | 19.2 |
| Total aromates (IP391) | % b.v. | 9.1 | 20.0 |
| Polyaromates (IP391) | % b.v. | 0.8 | 1.6 |
| n-paraffins | % b.w. | 14_7 | 24.5 |
| i-paraffins | % b.w. | 34.2 | 26.1 |
| Naphtenes | % b.w. | 42.4 | 30.2 | b.w. = by weight
b.v. = by volume

Example 2

Table 3 below compares the emission characteristics of a high quality reformed crude oil based diesel fuel available on the Finnish market (DITC, produced by Fortum Oyj), to those of compositions containing 30% by volume of hydrogenated and isomerized tall oil (TOFA), and 70% by volume of DITC, or containing 30% by volume of tall oil methyl ester (MME), and 70% by volume of DITC.

TABLE 3

| Characteristic | Unit | DITC | 30% b.v. TOFA 70% b.v. DITC | 30% b.v. MME 70% b.v. DITC |
|---|---|---|---|---|
| Cetane number | | 51 | 57 | 48 |
| NO, emissions (compared to DITC) | % | | −1 to −4 | +3 |
| Particles | % | | −3 | +22 |
| carbon | % | | −10 to −30 | 0 to −10 |
| PAH | % | | ±0 | ±0 |
| Combustion noise | | | decreases | ±0 | b.v. = by volume

The invention claimed is:

1. A diesel fuel composition comprising at least one isomerized biological component produced by a process comprising
    (1) providing a feed stream of fatty acids having saturated or unsaturated C6-C24 hydrocarbon chains, fatty acid esters having saturated or unsaturated C6-C24 hydrocarbon chains, or both, derived from at least one biological raw material;
    (2) hydrodeoxygenating the feed stream to form n-paraffins having carbon numbers in the C6-C24 range; and
    (3) isomerizing the n-paraffins to form an isomerized biological component comprising isoparaffins,
    wherein the isomerized biological component is suitable for use as a diesel fuel for a diesel engine, has a cetane number higher than 60, a turbidity point lower than −30° C., and is free of aromates.

2. A diesel fuel composition according to claim 1, wherein the isomerized biological component has a density less than crude oil based conventional diesel fuel.

3. A diesel fuel composition according to claim 1, wherein the isomerized biological component has a density less than rapeseed oil methyl ester based fuel.

4. A diesel fuel composition according to claim 1, wherein the biological raw material is chosen from animal-based material, plant-based material, fish-based material and mixtures thereof.

5. A diesel fuel composition according to claim 1, wherein the biological raw material is chosen from vegetable oils, animal fats, fish oils, and mixtures thereof.

6. A diesel fuel composition according to claim 1, wherein the biological raw material is chosen from animal-based fats, fats contained in milk, recycled fats of the food industry, wood-based fats or oils; non-wood, plant-based fats or oils; fats contained in plants bred by means of gene manipulation; fish oils; and mixtures thereof.

7. A diesel fuel composition according to claim 1, wherein the diesel fuel composition leaves no impurity residues.

8. A diesel fuel composition comprising at least one hydrodeoxygenated and isomerized biological component wherein the hydrodeoxygenated and isomerized biological component is suitable for use as a diesel fuel for a diesel engine, has a cetane number higher than 60, a turbidity point lower than −30° C., is free of aromates, and is produced by hydrodeoxygenating and isomerizing a feed stream of fatty acids having saturated or unsaturated C6-C24 hydrocarbon chains, fatty acid esters having saturated or unsaturated C6-C24 hydrocarbon chains, or both, derived from at least one biological raw material.

9. A diesel fuel composition according to claim 8, wherein the hydrodeoxygenated and isomerized biological component has a density less than crude oil based conventional diesel fuel.

10. A diesel fuel composition according to claim 8, wherein the hydrodeoxygenated and isomerized biological component has a density less than rapeseed oil methyl ester based fuel.

11. A diesel fuel composition according to claim 8, wherein the biological raw material is chosen from animal-based material, plant-based material, fish-based material and mixtures thereof.

12. A diesel fuel composition according to claim 8, wherein the biological raw material is chosen from vegetable oils, animal fats, fish oils, and mixtures thereof.

13. A diesel fuel composition according to claim 8, wherein the biological raw material is chosen from animal-based fats; fats contained in milk; recycled fats of the food industry; wood-based fats or oils; non-wood, plant-based fats or oils; fats contained in plants bred by means of gene manipulation; fish oils; and mixtures thereof.

14. A diesel fuel composition according to claim 8, wherein the fuel composition leaves no impurity residues.

15. An isomerized biological component for diesel fuel produced by a process comprising
   (1) providing a feed stream of fatty acids having saturated or unsaturated C6-C24 hydrocarbon chains, fatty acid esters having saturated or unsaturated C6-C24 hydrocarbon chains, or both, derived from at least one biological raw material;
   (2) hydrodeoxygenating the feed stream to form n-paraffins having carbon numbers in the C6-C24 range; and
   (3) isomerizing the n-paraffins to form an isomerized biological component comprising isoparaffins,
   wherein the at least one biological raw material is chosen from animal-based material, plant-based material, fish-based material or mixtures thereof,
   and wherein the isomerized biological component is suitable for use as a diesel fuel for a diesel engine, has a cetane number higher than 60, a turbidity point lower than $-30°$ C., is free of aromates, has a density less than rapeseed oil methyl ester based fuel, and leaves no impurity residues.

16. An isomerized biological component according to claim 15, having a density less than crude oil based conventional diesel fuel.

17. An isomerized biological component for diesel fuel produced by a process comprising
   (1) providing a feed stream of fatty acids having saturated or unsaturated C6-C24 hydrocarbon chains, fatty acid esters having saturated or unsaturated C6-C24 hydrocarbon chains, or both, derived from at least one biological raw material;
   (2) hydrodeoxygenating the feed stream to form n-paraffins having carbon numbers in the C6-C24 range; and
   (3) isomerizing the n-paraffins to form an isomerized biological component comprising isoparaffins,
   wherein the isomerized biological component is suitable for use as a diesel fuel for a diesel engine has a cetane number higher than 60 and a turbidity point lower than $-30°$ C.

18. An isomerized biological component according to claim 17, wherein the isomerized biological component is free of aromates.

19. An isomerized biological component according to claim 17, wherein the isomerized biological component has a density less than crude oil based conventional diesel fuel.

20. An isomerized biological component according to claim 17, wherein the isomerized biological component has a density less than rapeseed oil methyl ester based fuel.

21. An isomerized biological component according to claim 17, wherein the biological raw material is chosen from animal-based material, plant-based material, fish-based material and mixtures thereof.

22. An isomerized biological component according to claim 17, wherein the biological raw material is chosen from vegetable oils, animal fats, fish oils, and mixtures thereof.

23. An isomerized biological component according to claim 17, wherein the biological raw material is chosen from animal-based fats; fats contained in milk; recycled fats of the food industry; wood-based fats or oils; non-wood, plant-based fats or oils; fats contained in plants bred by means of gene manipulation; fish oils; and mixtures thereof.

24. An isomerized biological component according to claim 17, wherein the isomerized biological component leaves no impurity residues.

25. A diesel fuel composition according to claim 1, comprising a measurable amount of $^{14}C$.

26. A diesel fuel composition according to claim 8, comprising a measurable amount of $^{14}C$.

27. An isomerized biological component according to claim 15, comprising a measurable amount of $^{14}C$.

28. An isomerized biological component according to claim 17, comprising a measurable amount of $^{14}C$.

\* \* \* \* \*